United States Patent [19]

Kurnit

[11] 4,224,577
[45] Sep. 23, 1980

[54] MULTISTAGED STOKES INJECTED RAMAN CAPILLARY WAVEGUIDE AMPLIFIER

[75] Inventor: Norman A. Kurnit, Santa Fe, N. Mex.

[73] Assignee: The United States of America as represented by the United States Department of Energy, Washington, D.C.

[21] Appl. No.: 957,630

[22] Filed: Nov. 3, 1978

[51] Int. Cl.² ............................................. H03F 7/00
[52] U.S. Cl. ..................................... 330/4.5; 307/426; 330/4.6
[58] Field of Search .............. 307/88.3, 426; 330/4.5, 330/4.6

[56] References Cited

U.S. PATENT DOCUMENTS 4,095,121  6/1978  Begley et al. .................. 307/88.3

OTHER PUBLICATIONS

Frey et al, "Optics Communications", 22, 355–357, Sep. 1977.
Herriott et al, "Applied Optics", 3, 523–526, 1964.
Rabinowitz et al, "Optical Society of America", Oct. 1978, pp. 147–148.
Byer et al, "Optical Society of America", Oct. 1978, pp. 144–145.

*Primary Examiner*—Rudolph V. Rolinec
*Assistant Examiner*—Darwin R. Hostetter
*Attorney, Agent, or Firm*—R. V. Lupo; William W. Cochran, II; Paul D. Gaetjens

[57] ABSTRACT

A multistaged Stokes injected Raman capillary waveguide amplifier for providing a high gain Stokes output signal. The amplifier uses a plurality of optically coupled capillary waveguide amplifiers and one or more regenerative amplifiers to increase Stokes gain to a level sufficient for power amplification. Power amplification is provided by a multifocused Raman gain cell or a large diameter capillary waveguide. An external source of $CO_2$ laser radiation can be injected into each of the capillary waveguide amplifier stages to increase Raman gain. Devices for injecting external sources of $CO_2$ radiation include: dichroic mirrors, prisms, gratings and Ge Brewster plates. Alternatively, the $CO_2$ input radiation to the first stage can be coupled and amplified between successive stages.

53 Claims, 8 Drawing Figures

MULTISTAGED STOKES INJECTED RAMAN CAPILLARY WAVEGUIDE AMPLIFIER

BACKGROUND OF THE INVENTION

The present invention pertains generally to infrared lasers and amplifiers and more particularly to stimulated Raman scattering utilized rotational transitions in a diatomic molecular gas. The present invention comprises an improvement in the inventions disclosed in copending application Ser. No. 802,400 entitled "Shifting of $CO_2$ Laser Radiation Using Rotational Raman Resonances" filed June 1, 1977, by Norman A. Kurnit, now abandoned in favor of continuation-in-part application Ser. No. 960,409 entitled "Shifting of Infrared Radiation Using Rotational Raman Resonances in Diatomic Molecular Gases" filed Nov. 13, 1978 by Norman A. Kurnit and copending application Ser. No. 948,267 entitled "Stokes Injected Raman Waveguide Amplifier" filed Oct. 3, 1978 by Norman A. Kurnit. These commonly assigned copending applications disclose the basis for stimulated Raman scattering in a capillary waveguide and amplification of an external Stokes injection source in a Raman capillary waveguide amplifier.

SUMMARY OF THE INVENTION

The present invention provides a multistaged Stokes injected Raman capillary waveguide amplifier. A plurality of optically coupled capillary waveguide amplifiers are injected with an external source of $CO_2$ laser radiation to improve Raman gain. Progressively larger capillary diameters in successive stages provide greater output power of the amplified Stokes signal. Additionally, multiple stages can be used to provide a high gain Stokes signal for injection into a multifocused Raman gain cell to further increase output power. One or more stages of the capillary waveguide amplifier can employ regenerative amplification. Additionally, capillary waveguide material can be varied throughout the stages to enhance propagation of $CO_2$ radiation to increase gain in early stages and propagation of Stokes radiation to increase output power in latter stages.

It is therefore an object of the present invention to provide a multistaged Stokes injected Raman capillary waveguide amplifier.

Another object of the present invention is to provide a multistaged Stokes injected Raman capillary waveguide amplifier in conjunction with a multifocused Raman gain cell to provide high output powers.

Another object of the present invention is to provide a multistaged Stokes injected Raman capillary waveguide amplifier for providing high output power Stokes signals.

Another object of the present invention is to provide a multistaged Stokes injected Raman capillary waveguide amplifier which is highly efficient in operation.

Other objects and further scope of applicability of the present invention will become apparent in the detailed description given hereinafter. The detailed description, indicating the preferred embodiments of the invention, is given by way of illustration since various changes and modifications within the spirit and scope of the invention will become apparent to those skilled in the art from this detailed description. The foregoing Abstract of the Disclosure is for the purpose of providing a nonlegal brief statement to serve as a searching and scanning tool for scientists, engineers and researchers and is not intended to limit the scope of the invention as disclosed herein, nor is it intended to be used in interpreting or in any way limiting the scope or fair meaning of the appended claims.

DETAILED DESCRIPTION OF THE PREFERRED EMBODIMENT OF THE INVENTION

Figure 1:
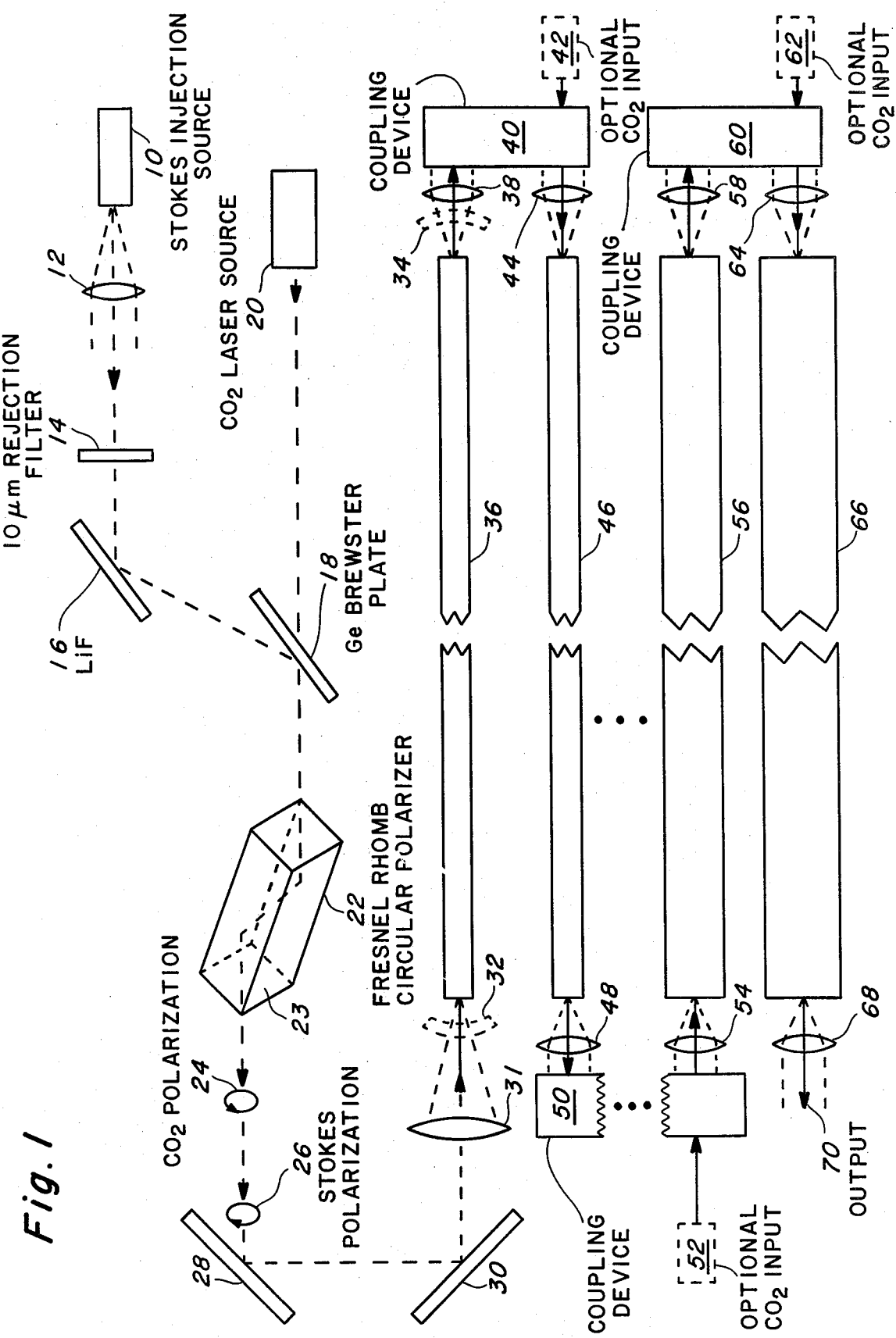
FIG. 1 is a schematic illustration of a multistaged Stokes injected Raman capillary waveguide amplifier comprising the preferred embodiment of the invention.

FIG. 1 is a schematic illustration of a multistaged Stokes injected Raman capillary waveguide amplifier comprising the preferred embodiment of the invention. According to the present invention, an external source of Stokes radiation from Stokes injection source 10 is combined with $CO_2$ laser radiation from $CO_2$ laser source 20 and circularly polarized in opposite circular directions. These radiation signals are applied to a capillary waveguide in the manner disclosed in copending application Ser. No. 948,267 entitled "A Stokes Injected Raman Capillary Waveguide Amplifier" filed Oct. 3, 1978 by Norman A. Kurnit. Capillary waveguide amplifier 36 comprises a capillary waveguide disposed within a Raman gain cell such that the Raman gain medium comprising $H_2$, $D_2$, HD, HT, DT, or $T_2$ is contained throughout the capillary. Additionally, the capillary is cooled to cryogenic temperatures by liquid nitrogen or other cooling medium. Partially reflecting mirrors 32 and 34, such as described in the above cited copending applications, can be utilized in one or more stages to create a regenerative amplifier for increasing Raman gain. This is particularly useful in low power stages where greater Raman gain is important.

Coupling device 40 couples the Stokes radiation generated by capillary waveguide amplifier 36 to an additional capillary waveguide amplifier stage 46. $CO_2$ radiation generated by $CO_2$ laser source 20 can be coupled through coupling device 40 or, alternatively, can be provided by an optional $CO_2$ input laser source 42. Of course, $CO_2$ laser radiation from $CO_2$ laser source 20 can be split and applied to coupling device 40 to eliminate additional $CO_2$ lasers 42, 52 and 62. Each of the coupling devices 40, 50 and 60 can comprise any of the devices shown in FIGS. 3–8. It should also be noted that each source of $CO_2$ laser radiation can comprise a multiple frequency beam to enhance generation of a multiple frequency Stokes output signal. Several Stokes injection frequencies corresponding to the several $CO_2$ frequencies may be necessary to provide sufficient gain on each of the Stokes output wavelengths. However, when sufficient gain is provided on a single Stokes frequency for which a sufficiently intense Stokes injection signal is provided, other output Stokes wavelengths are generated by a four-wave mixing process.

The composition of the waveguide material can be varied in successive stages to enhance generation of the desired signal. For example, initial stages such as 36 and 46 can contain capillaries fabricated from BeO which have low waveguide losses for $CO_2$ laser radiation in the 10 $\mu$m spectral region. Although BeO does not transmit Stokes radiation as well as $Al_2O_3$, the high transmission characteristics of the $CO_2$ radiation provides high gain which much more than offsets any losses due to lower transmission characteristics of the relatively low powered Stokes signals in the initial stages. However, in later stages, where the Stokes signal has a relatively high power magnitude, the capillary is constructed of $Al_2O_3$ or similar material that has low waveguide losses at the Stokes frequency. Although this provides less gain due to the lower transmission characteristics of the $CO_2$ radiation, lesser gain is required in the power stages compared to the desirability of transmitting the maximum amount of Stokes frequency radiation, which is particularly important since the waveguide losses are proportional to $\lambda^2$. Similarly, the capillary waveguide diameter and length can be increased in successive stages to provide greater power handling capability by supplying a larger quantity of Raman gain medium to produce the desired power output levels. Of course, focusing optics 44 and 54 are designed to provide successively larger focal areas such that the breakdown threshold of the Raman medium is not exceeded.

Figure 2:
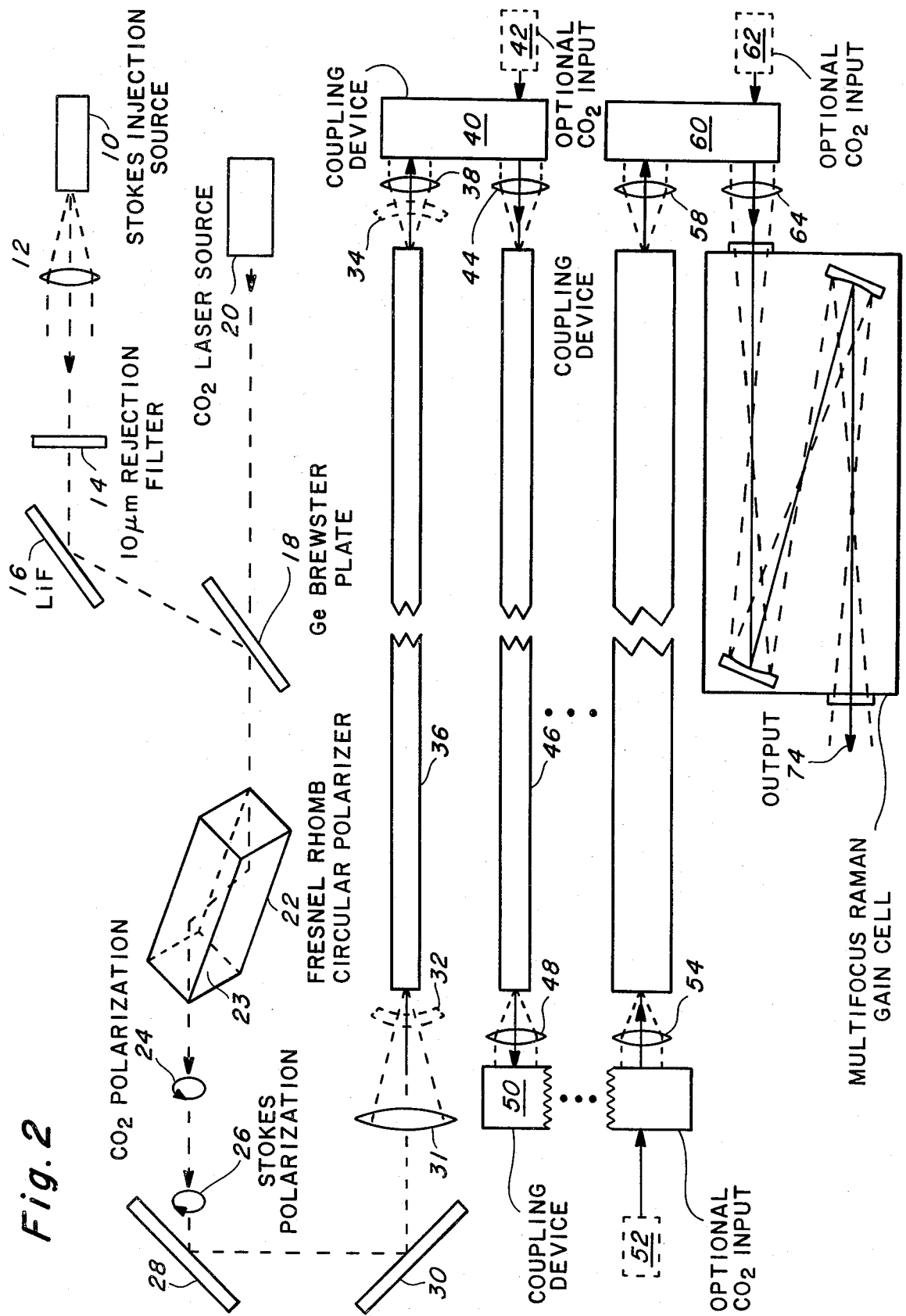
FIG. 2 is a schematic illustration of a multistaged Stokes injected Raman capillary waveguide amplifier in conjunction with a multifocused Raman gain cell.

FIG. 2 is a schematic illustration of a device which utilizes a multifocused Raman gain cell in the output power amplification stage.

An example of a multifocused Raman gain cell 72 is disclosed in an article entitled "Tunable, Millijoule Radiation Extending to the 16 $\mu$m Region" by Robert Frey et al., in Optics Communications 22, p. 355 (1977). An alternative multipass Raman gain cell for use with the embodiment of FIG. 2, utilizes the spherical interferometer disclosed in an article entitled "Off Axis Paths in Spherical Mirror Interferometers" by D. Herriott et al., in Applied Optics 3, p. 523 (1964), with an appropriate room temperature Raman gain medium such as $H_2$ as suggested by Robert L. Byer and W. R. Trutna at the Tenth International Quantum Electronics Conference, May 31, 1978 in Atlanta, Georgia. Again, the techniques described in FIG. 1 can be utilized for obtaining a suitable Stokes signal for injection into multifocused Raman gain cell 72.

Figures 3, 4, 8:
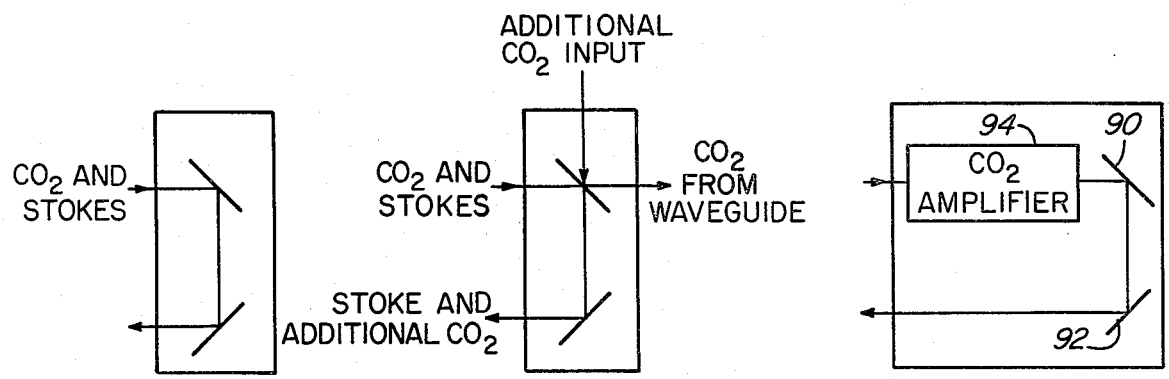
FIG. 3 is a schematic illustration of a reflective coupling device.
FIG. 4 is a schematic illustration of a dichroic mirror coupling device for injecting an external source of $CO_2$ radiation.
FIG. 8 is a schematic illustration of a reflective coupling device utilizing a $CO_2$ amplifier.

FIGS. 3-8 illustrate various coupling devices which can be used in FIGS. 1 and 2. FIG. 3 illustrates a reflective coupling device wherein both the Stokes and $CO_2$ radiation are transmitted from one stage to another. This type of reflective coupling device is useful when sufficient $CO_2$ energy is transmitted through the capillary waveguide to provide proper gain.

FIG. 4 is a schematic illustration of a dichroic mirror coupling device wherein an additional source of $CO_2$ radiation is coupled into a successive stage by means of dichroic optics 76 which function to totally reflect the Stokes frequency signal and transmit the $CO_2$ input frequency signal.

Figures 5, 6:
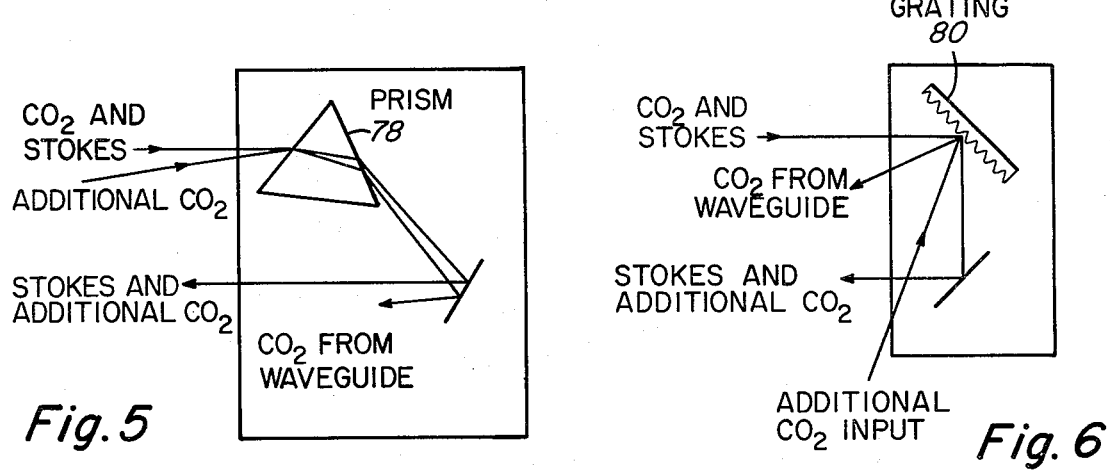
FIG. 5 is a schematic illustration of a prism coupling device for injecting an external source of $CO_2$ radiation.
FIG. 6 is a schematic illustration of a grating coupling device for injecting an external source of $CO_2$ radiation.

FIG. 5 schematically illustrates a prism coupling device wherein additional $CO_2$ frequency radiation is coupled into a successive capillary waveguide amplifier stage by utilizing the refraction characteristics of prism 78 as illustrated in FIG. 5.

FIG. 6 is a schematic illustration of a grating coupling which makes use of the different reflective angles obtainable from a grating for different signals. Additional $CO_2$ input signals are applied to the grating to align with the reflected Stokes signal.

Figure 7:
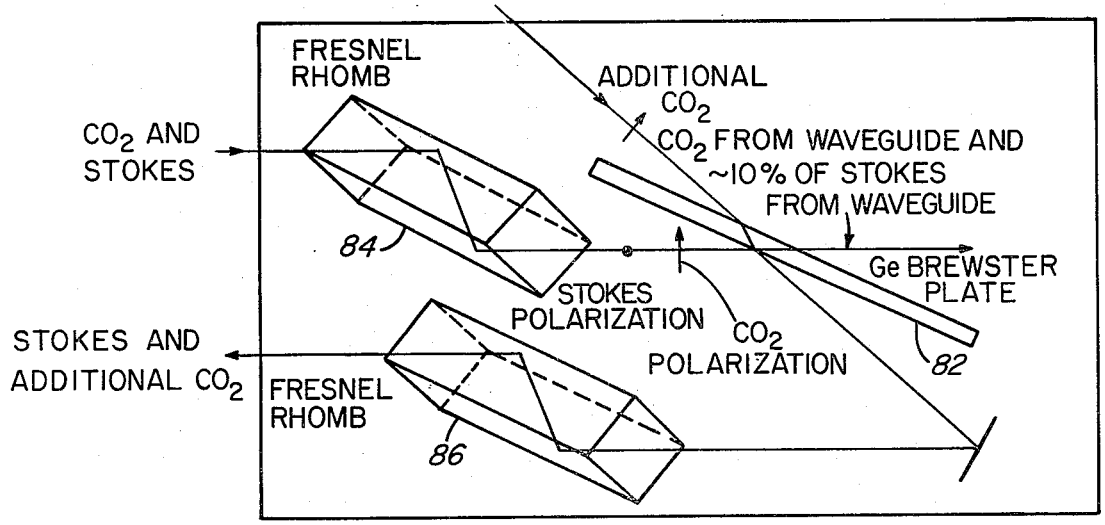
FIG. 7 is a schematic illustration of a Ge Brewster plate coupling device for injecting an external source of $CO_2$ radiation.

FIG. 7 is a schematic illustration of a Ge Brewster plate coupling device which couples additional $CO_2$ radiation through a Ge Brewster plate 82. The $CO_2$ Stokes radiation obtained from a preceeding stage is linearly polarized in Fresnel rhomb 84. The Stokes radiation is axially aligned with additional $CO_2$ radiation by Ge Brewster plate 82. The additional $CO_2$ radiation and Stokes radiation are then circularly polarized in opposite circular directions in Fresnel rhomb 86.

FIG. 8 is a schematic illustration of a coupling device which utilizes flat reflectors 90 and 92 to reflect both the Stokes and $CO_2$ radiation from one stage to another, in the manner disclosed in the coupling device of FIG. 3. Additionally, a $CO_2$ amplifier 94 is included within the coupling device to increase the gain of the $CO_2$ radiation transmitted through the capillary waveguide of the preceding stage to provide amplified $CO_2$ radiation for the succeeding stage. The Stokes radiation is also transmitted through the $CO_2$ amplifier. The Stokes radiation is transmitted without absorption and reflected into a succeeding amplification stage simultaneously with the $CO_2$ radiation. Each of the coupling devices 40, 50, and 60 illustrated in FIGS. 1 and 2 can comprise a coupling device as illustrated in FIG. 3 so as to eliminate the need for any of the optional $CO_2$ inputs 42, 52, or 62.

The present invention therefore provides a multistaged Stokes injected Raman capillary waveguide amplifier capable of producing high output power Stokes signals. The use of various coupling devices allows for high Raman gain and high powers in a series of successive stages. The use of successively larger capillary waveguides and various materials in waveguide fabrication also allows for increased power in successive amplification stages. Use of a multifocused Raman gain cell, additionally, provides a high output power amplification stage in which gas flow can be provided, if necessary, for greater power handling capability.

Obviously many modifications and variations of the present invention are possible in light of the above teachings. For example, the external source of Stokes radiation can be eliminated if sufficient gain is present in the initial stage to spontaneously generate the Stokes frequency signal. It is therefore to be understood that within the scope of the appended claims, the invention may be practiced otherwise than as specifically described and that subject matter disclosed and not claimed herein shall not be precluded from being later claimed in the present application or a continuation, continuation-in-part, or reissue application.

What is claimed is:

1. A Stokes injected Raman waveguide amplifier using rotational states in a diatomic molecular gas comprising:
   a plurality of capillary waveguide amplifiers;
   means for optically coupling said plurality of capillary waveguide amplifiers.

2. The amplifier of claim 1 further comprising:

means for injecting an external source of $CO_2$ laser radiation into at least one of said plurality of capillary waveguide amplifiers.

3. The amplifier of claim 2 wherein said source of $CO_2$ laser radiation comprises a multifrequency source of $CO_2$ laser radiation.

4. The amplifier of claim 1 wherein said means for optically coupling said plurality of capillary waveguide amplifiers comprises reflectors.

5. The amplifier of claim 2 wherein said means for injecting an external source of $CO_2$ input laser radiation comprises a dichroic mirror.

6. The amplifier of claim 2 wherein said means for injecting an external source of $CO_2$ input laser radiation comprises a prism.

7. The amplifier of claim 2 wherein said means for injecting an external source of $CO_2$ input laser radiation comprises a grating.

8. The amplifier of claim 2 wherein said means for injecting an external source of $CO_2$ input laser radiation comprises a Ge Brewster plate.

9. The amplifier of claim 1 wherein said plurality of capillary waveguide amplifiers comprises at least one capillary waveguide regenerative amplifier.

10. The amplifier of claim 1 wherein said plurality of capillary waveguide amplifiers have progressively larger diameters.

11. The amplifier of claim 1 further comprising a multifocus Raman gain cell.

12. The amplifier of claim 1 wherein capillary waveguides of initial stages of said plurality of capillary waveguide amplifiers are fabricated from BeO and of latter stages from $Al_2O_3$.

13. The amplifier of claim 1 further comprising $CO_2$ amplification means disposed to optically couple at least two of said plurality of capillary waveguide amplifiers.

14. The amplifier of claim 11 further comprising $CO_2$ amplification means disposed to optically couple at least one of said plurality of capillary waveguide amplifiers and said multifocus Raman gain cell.

15. A Stokes injected Raman waveguide amplifier using rotational states in a diatomic molecular gas comprising;
   means for generating a source of Stokes injection radiation;
   means for generating a source of $CO_2$ laser radiation;
   means for circularly polarizing said Stokes injection radiation and said $CO_2$ laser radiation in opposite circular directions;
   a plurality of optically coupled capillary waveguide amplifiers;
   means for applying said circularly polarized $CO_2$ laser radiation and said circularly polarized Stokes injection radiation to said plurality of optically coupled waveguide amplifiers.

16. The amplifier of claim 15 further comprising:
   means for injecting an external source of $CO_2$ laser radiation into at least one of said plurality of capillary waveguide amplifiers.

17. The amplifier of claim 15 wherein said source of $CO_2$ laser radiation comprises a multifrequency source of $CO_2$ laser radiation.

18. The amplifier of claim 16 wherein said means for injecting an external source of $CO_2$ input laser radiation comprises a dichroic mirror.

19. The amplifier of claim 16 wherein said means for injecting an external source of $CO_2$ input laser radiation comprises a prism.

20. The amplifier of claim 16 wherein said means for injecting an external source of $CO_2$ input laser radiation comprises a grating.

21. The amplifier of claim 16 wherein said means for injecting an external source of $CO_2$ input laser radiation comprises a Ge Brewster plate.

22. The amplifier of claim 15 wherein said plurality of capillary waveguide amplifiers comprises at least one capillary waveguide regenerative amplifier.

23. The amplifier of claim 15 wherein said plurality of capillary waveguide amplifiers have progressively larger diameters.

24. The amplifier of claim 15 further comprising a multifocus Raman gain cell.

25. The amplifier of claim 15 wherein capillary waveguides of initial stages of said plurality of capillary waveguide amplifiers are fabricated from BeO and of latter stages from $Al_2O_3$.

26. The amplifier of claim 15 further comprising at least one $CO_2$ amplifier disposed between said plurality of optically coupled capillary waveguide amplifiers.

27. The amplifier of claim 24 further comprising $CO_2$ amplification means disposed to optically couple at least one of said plurality of capillary waveguide amplifiers and said multifocus Raman gain cell.

28. A Stokes injected Raman waveguide amplifier comprising;
   a source of $CO_2$ laser radiation;
   a source of Stokes radiation;
   a plurality of optically coupled capillary waveguide amplifiers containing a Raman medium gas;
   means for injecting said source of $CO_2$ laser radiation and said source of Stokes radiation into said plurality of optically coupled capillary waveguide amplifiers to induce amplification of said Stokes radiation signal by Raman scattering of said $CO_2$ laser radiation by rotational states of said Raman medium gas.

29. The amplifier of claim 28 wherein said source of $CO_2$ laser radiation comprises a multifrequency source of $CO_2$ laser radiation.

30. The amplifier of claim 28 further comprising means for injecting an external source of $CO_2$ laser radiation into at least one of said plurality of capillary waveguide amplifiers.

31. The amplifier of claim 30 wherein said means for injecting an external source of $CO_2$ input laser radiation comprises a dichroic mirror.

32. The amplifier of claim 30 wherein said means for injecting an external source of $CO_2$ input laser radiation comprises a prism.

33. The amplifier of claim 30 wherein said means for injecting an external source of $CO_2$ input laser radiation comprises a grating.

34. The amplifier of claim 30 wherein said means for injecting an external source of $CO_2$ input laser radiation comprises a Ge Brewster plate.

35. The amplifier of claim 28 wherein said plurality of capillary waveguide amplifiers comprises at least one capillary waveguide regenerative amplifier.

36. The amplifier of claim 28 wherein said plurality of capillary waveguide amplifiers have progressively larger diameters.

37. The amplifier of claim 28 further comprising a multifocus Raman gain cell.

38. The amplifier of claim 28 wherein capillary waveguides of initial stages of said plurality of capillary waveguide amplifiers are fabricated from BeO and of latter stages from $Al_2O_3$.

39. The amplifier of claim 28 further comprising $CO_2$ amplification means for optically coupling at least two of said plurality of optically coupled capillary waveguide amplifiers.

40. The amplifier of claim 37 further comprising $CO_2$ amplification means disposed to optically couple at least one of said plurality of capillary waveguide amplifiers and said multifocus Raman gain cell.

41. A Raman waveguide amplifier comprising:
a source of $CO_2$ laser radiation;
a plurality of optically coupled capillary waveguide amplifiers containing a Raman medium gas;
means for injecting said source of $CO_2$ laser radiation into said plurality of optically coupled capillary waveguide amplifiers to induce amplification of a Stokes radiation signal by Raman scattering of said $CO_2$ laser radiation by rotational states of said Raman medium gas.

42. The amplifier of claim 41 wherein said source of $CO_2$ laser radiation comprises a multifrequency source of $CO_2$ laser radiation.

43. The amplifier of claim 41 further comprising means for injecting an external source of $CO_2$ laser radiation into at least one of said plurality of capillary waveguide amplifiers.

44. The amplifier of claim 43 wherein said means for injecting an external source of $CO_2$ input laser radiation comprises a dichroic mirror.

45. The amplifier of claim 43 wherein said means for injecting an external source of $CO_2$ input laser radiation comprises a prism.

46. The amplifier of claim 43 wherein said means for injecting an external source of $CO_2$ input laser radiation comprises a grating.

47. The amplifier of claim 43 wherein said means for injecting an external source of $CO_2$ input laser radiation comprises a Ge Brewster plate.

48. The amplifier of claim 41 wherein said plurality of capillary waveguide amplifiers comprises at least one capillary waveguide regenerative amplifier.

49. The amplifier of claim 41 wherein said plurality of capillary waveguide amplifiers have progressively larger diameters.

50. The amplifier of claim 41 further comprising a multifocus Raman gain cell.

51. The amplifier of claim 41 wherein capillary waveguides of initial stages of said plurality of capillary waveguide amplifiers are fabricated from BeO and of latter stages from $Al_2O_3$.

52. The amplifier of claim 41 further comprising $CO_2$ amplification means for optically coupling at least two of said plurality of optically coupled capillary waveguide amplifiers.

53. The amplifier of claim 50 further comprising $CO_2$ amplification means disposed to optically couple at least one of said plurality of capillary waveguide amplifiers and said multifocus Raman gain cell.

* * * * *